United States Patent [19]

Berryhill

[11] Patent Number: 5,247,809
[45] Date of Patent: Sep. 28, 1993

[54] AIR WASHER AND METHOD

[75] Inventor: Robert A. Berryhill, Stokesdale, N.C.

[73] Assignee: Austin-Berryhill Fabricators, Inc., Greensboro, N.C.

[21] Appl. No.: 986,872

[22] Filed: Dec. 4, 1992

Related U.S. Application Data

[63] Continuation of Ser. No. 769,780, Oct. 2, 1991, abandoned.

[51] Int. Cl.⁵ .......................... F28C 1/00; F28D 5/00
[52] U.S. Cl. ................................... 62/304; 62/310; 261/DIG. 3
[58] Field of Search ............... 62/304, 309, 310, 316, 62/121; 236/44 C; 261/DIG. 3

[56] References Cited

U.S. PATENT DOCUMENTS

| | | | |
|---|---|---|---|
| 3,042,383 | 7/1962 | Pennington | 62/121 |
| 3,965,690 | 6/1976 | Berryhill | 62/121 |
| 4,089,666 | 5/1978 | Knight | 62/91 |
| 4,156,351 | 5/1979 | Schlon et al. | 62/121 |
| 4,552,303 | 11/1985 | Fisher et al. | 236/44 C |

Primary Examiner—Albert J. Makay
Assistant Examiner—William C. Doerrler

[57] ABSTRACT

The invention herein provides an air washer and method for economical operation whereby the dew point temperature of air in a conditioned space can be consistently controlled year-round. The air washer includes a manifold whereby chilled water and recirculated ambient temperature water are mixed to provide an efficient and precise temperature blend for spraying the airstream passing through the air washer into the conditioned space.

14 Claims, 1 Drawing Sheet

AIR WASHER AND METHOD

This application is a continuation of application Ser. No. 769,780 filed Oct. 2, 1991, now abandoned.

BACKGROUND OF THE INVENTION

1. Field of the Invention

This invention pertains to air washers and particularly to air washers utilizing chilled water for providing a constant dew point temperature to air in a conditioned area such as a textile plant or the like.

2. Description of the Prior Art And Objectives Of The Invention

It is of extreme importance in certain textile operations and other manufacturing facilities to maintain a constant dew point temperature within the air to increase production and to prevent manufacturing equipment shut-downs due to breaks or jams which occur as a result of static electricity and decreases in relative humidity of the surrounding air.

In U.S. Pat. No. 4,089,666 a method is described for controlling temperature and humidity of air in a manufacturing facility by using chilled spray water in an air washer. In this method the sprayed airstream is split into first and into second portions in order to obtain the desired dry bulb temperature and relative humidity values required. The divided airstream has a first portion which passes through tobacco directly from the air washer whereas the second portion is heated prior to use. In U.S. Pat. No. 3,965,690, separate piping is employed for the humidity spray and chilled water spray applications in an effort to obtain constant dew point temperatures in a conditioned space.

While the above mentioned patents utilize air washers, neither of the patents set forth structure by which ambient temperature recirculating water and chilled water are combined in a manifold to insure the proper and most desirable economical temperature spray to maintain a constant dew point of the conditioned space by the air exiting the air washer.

Thus, the aforesaid differences and disadvantages known to prior art air conditioning devices, it is an objective of the present invention to provide an air washer having a spray manifold which is joined to both a chilling water supply and an ambient temperature water supply to provide a precisely controlled water spray.

It is yet another objective of the present invention to provide an air washer which economically provides a year-round constant dew point temperature to a conditioned space.

It is yet another objective of the present invention to provide an air washer which includes a thermostat and humidistat positioned in the exiting airstream for precisely controlling the dew point of a conditioned space.

Various other advantages and objectives of the invention will be realized as a more detailed explanation is provided below.

BRIEF DESCRIPTION OF THE DRAWINGS

The improved air washer in accordance with the present invention is shown in FIG. 1 which demonstrates an inside view of the air washer and related components.

DETAILED DESCRIPTION OF THE DRAWING AND PREFERRED EMBODIMENTS

Figure 1:
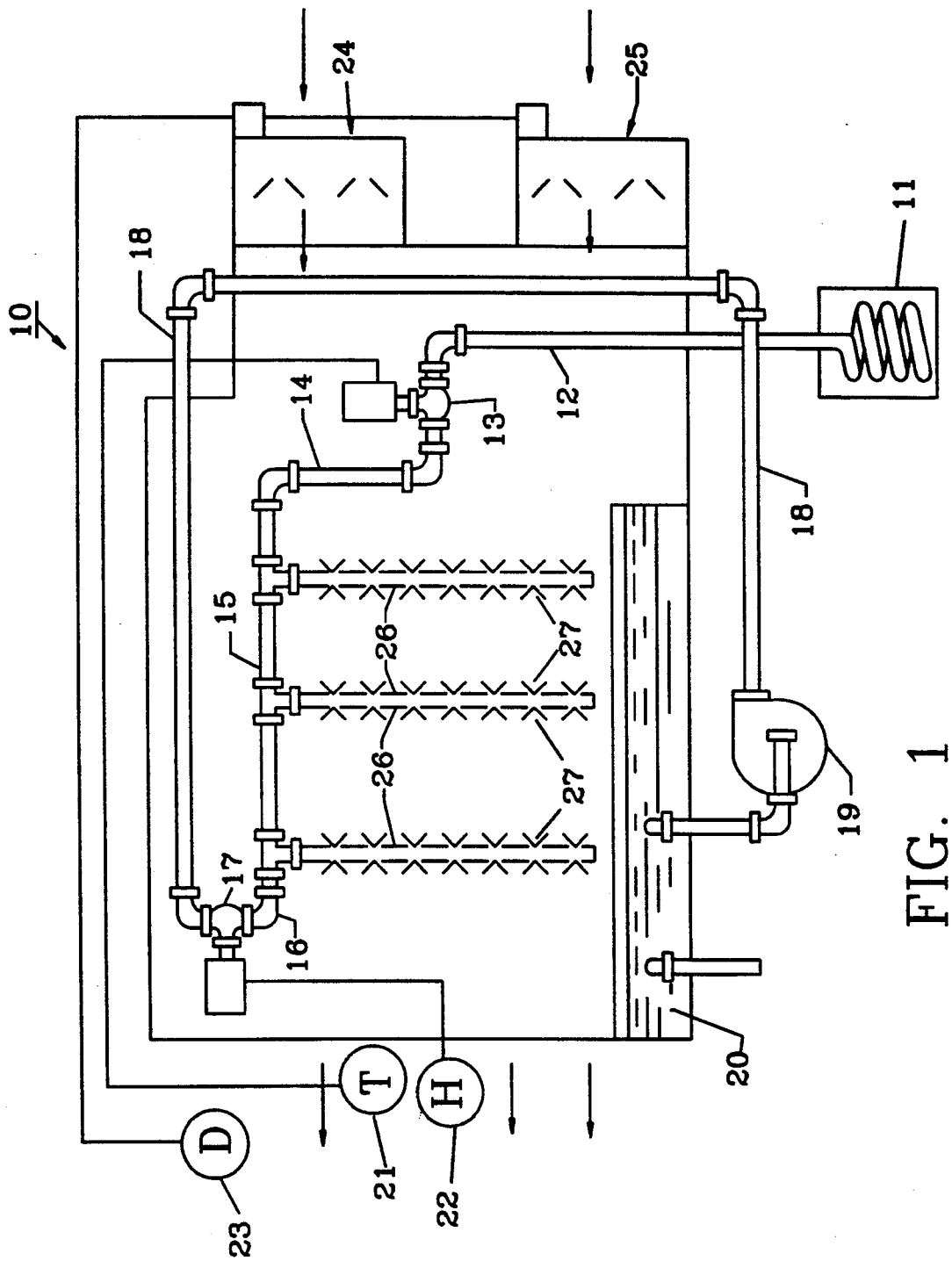

The aforesaid advantages and objectives are provided in the preferred embodiment of the apparatus and method as illustrated and described in reference to FIG. 1. A chilled water supply 11 which may be a conventional refrigeration unit directs chilled water through conduit 12 to control valve 13, conduit 14 and into spray manifold 15. Spray manifold 15 in turn provides water to conventional spray tubes 26, three of which are shown in FIG. 1 although more or less may be available depending on the particular size and configuration of air washer 10 utilized. Spray tubes 26 include spray nozzles 27. Manifold 15 is also in fluid communication with conduit 16 which receives recirculated, ambient temperature water through valve 17 from conduit 18, through which water is forced by pump 19. As would be understood water is collected in sump 20 which acts as a means to collect any excess water from spray nozzles 27 and provides a reservoir for ambient temperature water for pump 19.

As further shown in FIG. 1 chilled water valve 13 is controlled by thermostat 21 which is positioned immediately outside of air washer 10 but within the airstream of the exiting air. Valve 17 is controlled by humidistat 22 which is also positioned in the exiting airstream for the most accurate humidity control. Conventional damper controls 23 are also shown in FIG. 1 electrically connected for controlling return air damper 24 and fresh air damper 25. Dampers 24 and 25 are regulated depending on the temperature of the outside air and desired temperature of the inside air. For example, in the cold wintertime the amount of return relative to outside air received by air washer 10 would generally be more in order to maintain the temperature within the conditioned space at a comfortable level for workers whereas in the hot summertime less outside air than in wintertime would generally be received by washer 10.

In order to maintain a constant dew point temperature of a room by air exiting air washer 10, the temperature of the air entering washer 10 at different times of the year will need to be cooled and dehumidified or humidified. In the summertime very little humidifying is usually needed but additional cooling is required. In the wintertime more humidifying is generally needed. Air washer 10 thus allows cold or chilled water to be sprayed through all spray tubes 26 when humidity is not needed which in turn allows the air to be dehumidified and cooled. When air passes through washer 10 which is at a temperature above the dew point of the air, the air can thus be conveniently dehumidified. When air leaving washer 10 is below the dew point temperature, humidistat 22 will open valve 17 which causes the recirculated ambient temperature water in conduit 18 to blend with the chilled water in conduit 14 to raise the temperature of the water spray thereby adding humidity to the airstream. Thus, a precise method or control of the exiting air affords a constant dew point temperature for a conditioned space utilizing less spray tubes than conventional air washers and a more economical operation.

As would be understood, the method of maintaining a constant dew point temperature of room air by the airstream exiting washer 10 is presented wherein the temperature and humidity of the exiting air is immediately sensed by thermostat 21 and humidistat 22. Thermostat 21 is electrically connected to chill water valve 13 and humidistat 22 is connected to ambient temperature or recirculating water conduit 18. The particular operational positions of valves 13 and 17 as required respectively, by thermostat 21 and humidistat 22, cause the precise spray water temperature to be achieved and controlled within manifold 15 and the water accurately blended prior to entering spray tubes 26.

The illustrations and examples provided herein are for explanatory purposes and are not intended to limit the scope of the appended claims.

I claim:

1. An air washer having an airstream passing therethrough for maintaining a substantially constant dew point temperature to a conditioned space comprising:
   (a) a means to spray water into the airstream as air enters the washer, said spray means comprising an elongated manifold, a plurality of spray tubes, said spray tubes in fluid communication with said manifold,
   (b) a means for chilling the water prior to spraying, said chilling means in fluid communication with one end of said manifold,
   (c) a means for collecting excess water sprayed into the airstream, said collecting means in fluid communication with the opposite end of said manifold,
   (d) a means for pumping water from said collecting means, said pumping means in communication with said collecting means and said manifold,
   (e) a means to control said chilling means, said chilling control means in communication with said chilling means, and
   (f) a means to control said pumping means, said pumping control means in communication with said pumping means,
   whereby water can enter said manifold from said chilling means and said collecting means simultaneously through opposite ends of said manifold and can exit each of said spray tubes at a different temperature.

2. The air washer of claim 1 and including temperature regulating means, said temperature regulating means connected to said chilling control means.

3. The air washer of claim 1 and including humidity regulating means, said humidity regulating means connected to said pumping control means.

4. The air washer of claim 2 wherein said temperature regulating means comprises a thermostat.

5. The air washer of claim 3 wherein said humidity regulating means comprises a humidistat.

6. The air washer of claim 1 wherein said chilling control means comprises a valve.

7. The air washer of claim 1 wherein said pumping control means comprises a valve.

8. An air washer comprising:
   (a) means to spray water into the airstream passing therethrough, said spray means comprising an elongated manifold, a plurality of spray tubes, said spray tubes in fluid communication with said manifold,
   (b) means to chill water, said chilling means connected to said manifold at one end thereof,
   (c) means to collect excess spray water, said collecting means in fluid communication with said washer,
   (d) means for pumping water from said collecting means to said spray means, said pumping means in fluid communication with said collecting means and with said manifold at the other end thereof,
   (e) means to control said chilling means, said chilling means control connected to said chilling means,
   (f) means to regulate temperature, said temperature regulating means connected to said chilling control means,
   (g) means to control said pumping means, said pumping control means connected to said pumping means, and
   (h) means to regulate humidity, said humidity regulating means connected to said pumping control means,
   whereby water can enter one end of said manifold from said chilling means and can enter the other end of said manifold from said collecting means simultaneously where it can be sprayed into said airstream at different temperatures through different spray nozzles.

9. The air washer of claim 8 comprising damper control means, said damper control means positioned proximate said washer, said damper control means for regulating the amount of outside air received by said air washer.

10. A method of maintaining a constant dew point temperature to a conditioned space by controlling an airstream as it exits an air washer by spraying the airstream within the washer with chilled and ambient temperature water directed into opposite ends of a manifold where the water passes through a plurality of spray tubes connected to said manifold comprising the steps of:
    (a) sensing the temperature and humidity of the airstream as it exits the washer,
    (b) regulating the amount of chilled water directed into the manifold in accordance with the temperature of the airstream,
    (c) regulating the amount of ambient temperature water directed into the manifold in accordance with the humidity of the airstream, and
    (d) spraying the airstream with different temperature water from each of the spray tubes.

11. The method of claim 10 wherein the step of sensing the temperature and humidity of the airstream comprises sensing the temperature and humidity with a thermostat and humidistat immediately as the airstream exits the washer.

12. The method of claim 10 wherein the step of regulating the amount of chilled spray water comprises operating a chilled water control valve.

13. The method of claim 10 wherein the step of regulating the ambient temperature spray water comprises the step of operating an ambient temperature water control valve.

14. The method of claim 10 and including the step of controlling the outside air/return air ratio received by said air washer.

* * * * *